United States Patent [19]

Mizokawa

[11] Patent Number: 4,530,009

[45] Date of Patent: Jul. 16, 1985

[54] IMAGE INFORMATION SYNTHESIZING TERMINAL EQUIPMENT

[75] Inventor: Takumi Mizokawa, Kobe, Japan

[73] Assignee: Kabushiki Kaisha Kobe Seiko Sho, Kobe, Japan

[21] Appl. No.: 321,779

[22] Filed: Nov. 16, 1981

[30] Foreign Application Priority Data

Nov. 20, 1980 [JP] Japan ............................ 55-164173

[51] Int. Cl.[3] ............................................ H04N 5/22

[52] U.S. Cl. .................................... 358/183; 358/903

[58] Field of Search ............... 358/183, 180, 182, 185, 358/22, 21 R, 903, 244, 143; 340/705, 716

[56] References Cited

U.S. PATENT DOCUMENTS

| | | | |
|---|---|---|---|
| 2,073,370 | 3/1937 | Goldsmith | 358/183 |
| 3,387,084 | 6/1968 | Hine et al. . | |
| 3,786,479 | 1/1974 | Brown et al. | 340/324 AD |
| 3,836,902 | 9/1974 | Okuda et al. | 340/324 AD |
| 4,208,675 | 6/1980 | Bajon | 358/183 |
| 4,278,347 | 7/1981 | Okamoto | 358/244 |
| 4,334,245 | 6/1982 | Michael | 358/183 |

FOREIGN PATENT DOCUMENTS

| | | | |
|---|---|---|---|
| 36910 | 3/1977 | Japan | 358/143 |

OTHER PUBLICATIONS

IBM Technical Disclosure Bulletin, vol. 16, No. 7; pp. 2154–2155.

*Primary Examiner*—Tommy P. Chin
*Attorney, Agent, or Firm*—Oblon, Fisher, Spivak, McClelland & Maier

[57] ABSTRACT

A display terminal equipment for information processing system comprising an image storage unit and an image synthesizing unit. Information to be displayed is divided into a fixed background picture such as graphic patterns, tables and flowsheets produced by a video camera and stored in the image storage unit, and a foreground picture mainly made up of numeric characters and is supplied from a computer. The background and foreground pictures are mixed by the image synthesizing unit and displayed on a CRT screen.

4 Claims, 6 Drawing Figures

IMAGE INFORMATION SYNTHESIZING TERMINAL EQUIPMENT

BACKGROUND OF THE INVENTION

1. Field of the Invention

This invention relates to an image information synthesizing terminal equipment used as a display terminal for information processing systems such as computers.

2. Description of the Prior Art

Recently, information processing utilizing computers has expanded its domain and also increased its versatility and comprehensiveness. It is now applied to process control in addition to office jobs and scientific calculation.

For example, in process control of various chemical plants and the like, the computer performs control, monitoring and data recording for the process. The most important aspect is that information is transacted smoothly and surely between the computer and the operator (i.e. man-machine communication).

Between the operator and the computer, information is transacted through a terminal equipment referred to as a console, which typically includes a CRT (cathode ray tube) display because of the following advantages.

1. A large quantity of information can be displayed on the CRT screen at one time.
2. Color display is possible.
3. Graphic patterns, tables and graphic panels can be displayed in addition to literal and numeric characters.
4. Quick response of display is achieved without noises.
5. Various graphic patterns can be displayed alternately on the same CRT screen.

The CRT display of the console has been used to display alphabetic and numeric characters. There is a trend in using the CRT screen for displaying a combination of graphic patterns, tables, process flowsheets, graphic panels, Kanji, and the like in order to achieve more comprehensive communication between the computer and the operator. Recently there has also been a further need of providing acoustic information output in addition to graphically displayed information as mentioned above.

The conventional terminal equipment, however, could only display information retrieved from the computer, and in order to satisfy the above-mentioned requirements it would necessitate a considerable manpower for developing output programs, a large storage capacity for storing the software and a vast support software package, and also would pose an overhead problem for the computer.

It is desirable to create the screen format in the ordinary use language or one that can be understood by the user (e.g., French, Portuguese, Spanish, Arabic, Chinese, Russian, etc.). Therefore, the screen format must have been amended each time to meet the user's language, resulting disadvantageously in a further increase of software for displaying information.

Prior Art in this area include Japanese Patent Publication No. SHO 49-21970 which corresponds to Swedish Pat. No. 349,165, EPC application No. 79300383.1 which is published as 4,197 to RCA corp., and IBM Technical Disclosure Bulletin Vol. 22 No. 3 Aug. 1979, PP 1200~1201, "Extended Function on Character Display".

SUMMARY OF THE INVENTION

The present invention is contemplated to solve the above-mentioned problems in the conventional terminal equipment for information processors. Accordingly, it is a primary object of the invention to provide an image information synthesizing terminal equipment comprising an image storage unit for storing the video signal of a fixed background picture which has been produced corresponding to the output program by a picture signal generating apparatus such as a video camera, and an image synthesizing unit for adding the video signal of a foreground picture, which varies as a result of information processing, to the video signal of the background picture retrieved from the image storage unit, whereby an arbitrary background picture is stored in the image storage unit for displaying the background picture by the video signal retrieved from the image storage unit instead of an output program for producing the background picture, thereby facilitating the production of the screen including entire picture information such as the user oriented language, graphic patterns, tables, process flowcharts, and the like, and providing a smooth communication between the operator and the computer.

The second object of the invention is to provide an image information synthesizing terminal equipment wherein the image storage unit stores the audio signal as well as the video signal, thereby providing a video output and audio output at the same time.

The third object of the invention is to provide an image information synthesizing terminal equipment which allows the production of a hard copy of the displayed screen using a hard copy appratus.

The fourth object of the invention is to provide an image information synthesizing terminal equipment which has in its storage unit an area for storing the video signal from the image signal synthesizing unit so that the operation of the information processor will be able to undergo checking and analysis.

These and other objects of the present invention will become apparent from the following detailed description and the accompanying drawings for the embodiment wherein the invention is applied to process control.

DETAILED DESCRIPTION OF THE INVENTION AND PREFERRED EMBODIMENTS

Figure 1:
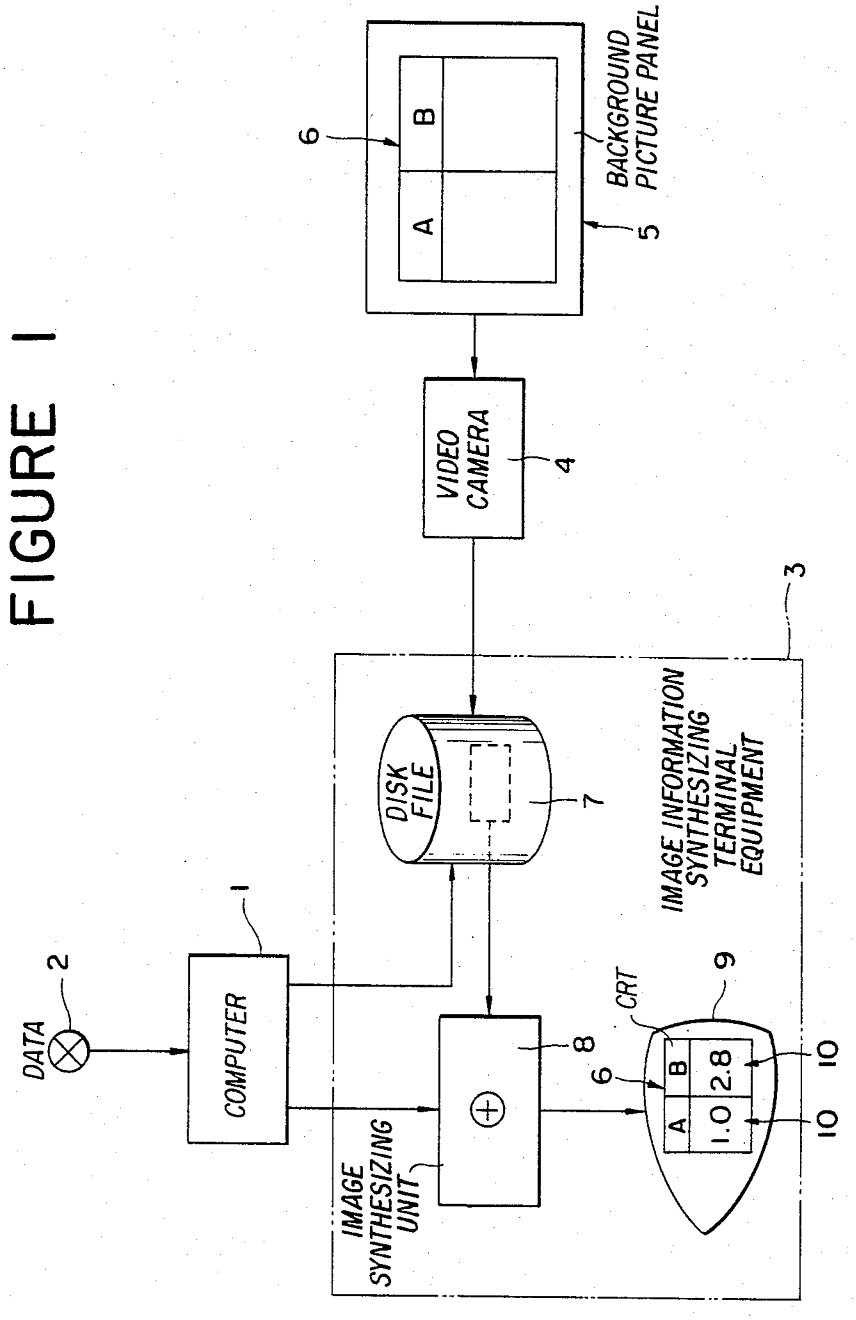
FIG. 1 is a block diagram showing the system configuration of the image information synthesizing terminal equipment embodying the present invention.

According to the present invention, an operation screen is divided into a foreground picture which varies during the display and a fixed background picture. The foreground picture is displayed based on data processed by a computer, whereas the background screen is displayed based on information retrieved from an image storage unit such as a video disk file operating independently of the computer, so that these two pieces of display information are superimposed on the CRT screen. FIG. 1 is a block diagram of an embodiment of this invention, showing a computer 1 for implementing supplied process data 2, an image information synthesizing terminal equipment 3 which will be described in the following, and a video camera 4 for transforming a background picture 6 drawn on a background picture panel 5 into the video signal.

The image information synthesizing terminal equipment 3 comprises a video disk file 7 as an image storage unit for storing the video signal of the background picture 6, an image synthesizing unit 8 for adding the video signal of the background picture 6 stored in the video disk file 7 to the video signal of the foreground picture supplied from the computer 1, and a CRT display unit 9 for displaying a newly developed video signal from the image synthesizing unit 8. The image information synthesizing terminal equipment may further comprise a key board so that a necessary image information can be selected out of video memory disk file by operating and key board.

The video disk file 7 stores the video signal produced by shooting with the video camera 4 the background picture 6 which has been drawn on the background picture panel 5 in accordance with the output program of the computer 1, and sends out to the image synthesizing unit 8 the video signal of a background picture specified by the background picture selection signal issued by the computer in accordance with the output program.

The image synthesizing unit 8 is a video mixer circuit known in the art, which adds the video signal of a foreground picture supplied from the computer 1 to the video signal of a background picture supplied from the video disk file 7 in accordance with the background picture selection signal. The resultant output signal is supplied to the CRT display unit 9, on which the foreground picture 10 is superimposed on the background picture 6. Thus, more than two graphic information can be superimposed to form a background picture.

Furthermore, such a graphic information can be displayed on a CRT screen with desired display co-ordinate, desired size and desired brightness so that such information would occupy only a limited but desired area of the CRT screen.

Graphic information stored in a file can be shared by different CRT screens by ways of the above mentioned technique.

Graphic information stored in a file can be displayed with adjusted brightness in concordance with data of the computer.

The basic operations of the system shown in FIG. 1 will now be described.

Figure 2A:
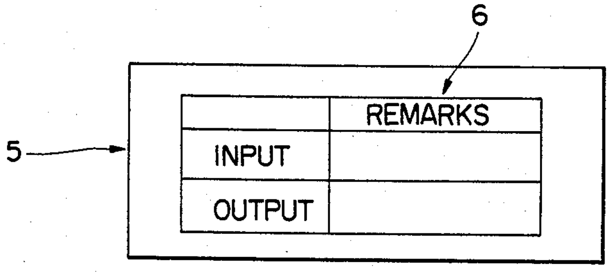
FIGS. 2*a* and 2*b* are plan views each illustrating an example of the background picture panel.
Figure 2B:
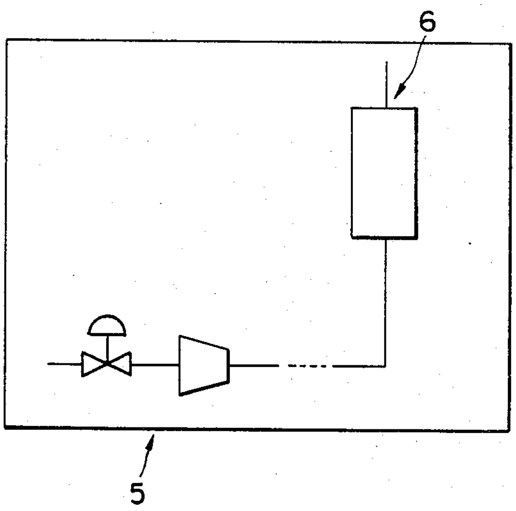

Background picture panel production:

The background picture panel 5 is produced in the same way as in the conventional drawing procedures. That is, items of the background picture 6, such as a table shown in FIG. 2*a* or a process flowsheet shown in FIG. 2*b*, used in the output program of the computer 1 is drawn by hand or produced by sticking on a sheet of drawing paper and the like.

In this case, any type of characters including alphabetic and numeric characters, Arabic letters, Russian letters, etc. in any size which can be shot by the video camera 4 can be used, and a color video camera 4 may be used for providing a colorful background picture 6.

Background picture registraition to video disk file:

The background picture panel 5, as produced through the above-mentioned process, is shot by the video camera 4, and then stored in the video disk file 7.

Since a shot in a short duration is required, the video disk file 7 can store numerous background pictures.

Foreground information production:

The computer 1 receives information such as process data 2 useful to display as a foreground picture 10, and edits data in accordance with the specification of the foreground picture 10.

Operation screen display request:

When the operator enters an operation screen display request to the computer 1, it edits and outputs the continuously varying foreground information and also issues the background picture selection signal corresponding to the background information needed for the requested operation screen.

Superimposed display of operation screen:

Through the process as described in "Operation screen display request", the video signal of the continuously varying foreground picture 10 supplied from the computer 1 and the video signal of the background picture 6 stored in the video disk file 7 in accordance with the background picture selection signal issued by the computer 1 are added by the image synthesizing unit 8 to form a new video signal. Then, a display of numeric characters, e.g., "1.0", "2.8", etc., as the foreground picture 10 is obtained in entries of a table as the background picture 6 on the screen of the CRT display unit 9, as illustrated in FIG. 1.

It can be seen from the above description that the output program for the background picture 6 is substituted by the video signal of the background picture 6 stored in the video disk file 7.

Operation screen modification:

In order to modify the background picture 6 for the operation screen, a modification is made for the background picture 6 drawn on the background picture panel 5 using an eraser, and then it is shot by the video camera 4 so as to update image data in the video disk file 7.

Modification of the foreground picture 10 for the operation screen needs a change of the output program of the computer 1, however, the foreground picture 10 is mainly made up of numeric characters such as for process data, and the output program for such display information can be modified easily.

Language alteration on operation screen:

There is occasionally a requirement for producing an operation screen in a specific language, for example, for the heading of the table, while leaving remaining portions as the existing work.

In such cases, only a background picture panel in the specific language needs to be produced.

Figure 3:
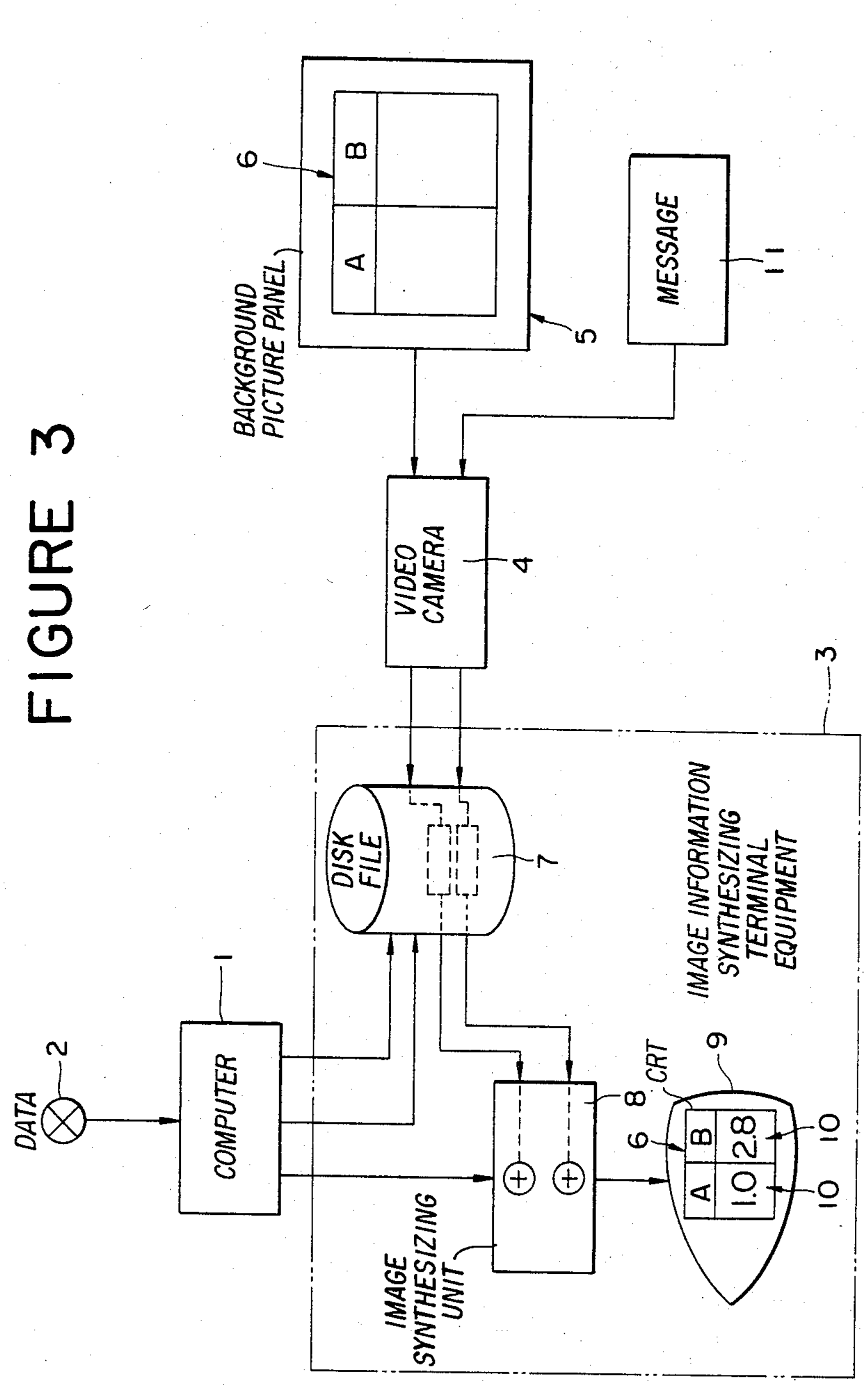
FIG. 3 is a block diagram showing a variation of the system of FIG. 1.

FIG. 3 shows an embodiment of the invention wherein the operator guidance is performed in both visual and audible ways.

In the embodiment of FIG. 3, a message 11 to be instructed to the operator of the process control system is transformed into the electrical signal through a microphone and an associated amplifier (which may be incorporated within a video camera 4), and the message 11 is stored together with a background picture 6 in a video disk file 7, so that the video disk file 7 outputs the video signal of the background picture 6 and the audio signal of the message 11 in response to the background picture selection signal and the message selection signal issued by the computer 1, thereby directing the operator in both visual and audible ways.

Dictation to the operator in both the visual and audible ways as described above will significantly enhance the man-machine communication.

Figure 4:
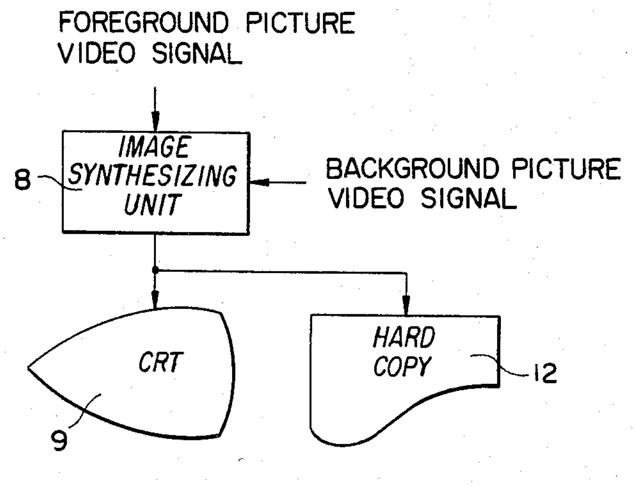
FIG. 4 is a block diagram showing the provision of a hard copy unit to the system of FIG. 1 or 3.

FIG. 4 shows a modified embodiment based on FIG. 1 or 3, wherein there is provided a hard copy unit 12 which produces a hard copy of the displayed screen on the CRT display unit 9 in response to the video signal from the image synthesizing unit 8, whereby the display screen on the CRT display unit 9 can be preserved in the form of a hard copy.

Figure 5:
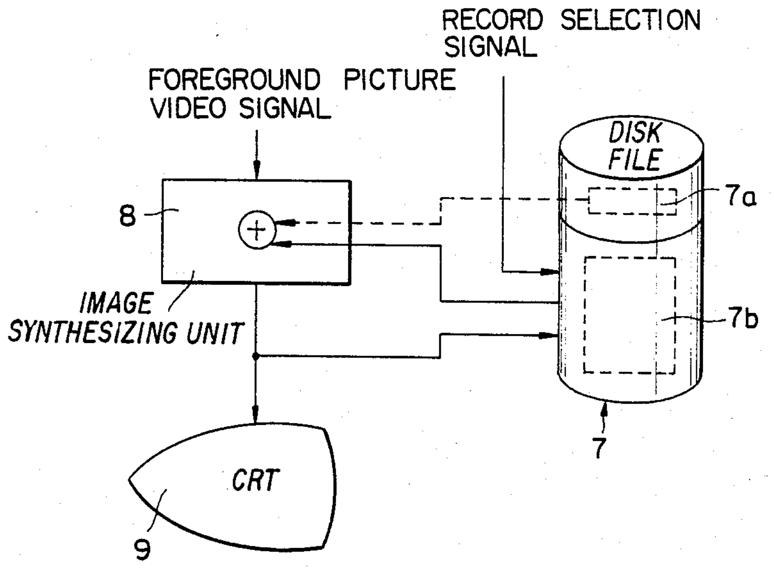
FIG. 5 is a block diagram showing another embodiment of the invention wherein the operational history is recorded and reproduced.

FIG. 5 shows a modified embodiment based on FIG. 1, 3 or 4, wherein a video disk file 7 is arranged to have a storage area, in addition to an area 7*a* for storing the video signal of an background picture 6, where the operational history of the operation screen which has been supplied from the image synthesizing unit 8 and displayed on the CRT display unit 9 is stored in time-series fashion.

In this arrangement, an arbitrary screen can be reproduced on the CRT display unit 9 by the record selection signal issued by the computer 1. In this case, the audible message can also be recorded and reproduced.

The present invention has been described by way of basic embodiments, however, the invention is not limited to the above embodiments. For example, in a system where several terminal equipments use the operation screen of the same specification, a single video disk file 7 can be shared by the terminal equipments, thereby allowing the production of only a single video disk file 7.

Otherwise, if it is difficult to share a single video disk file with all terminal equipments, the video disk file 7 may be copied and distributed to some locations, thereby allowing the production and modification of a video disk file only once.

Moreover, when only the background is desired to update, while leaving the foreground unchanged, it is achieved by selection of a background picture, thereby providing a possibility of animation.

Futhermore, in FIGS. 1, 3 and 5, it is possible that the background picture selection signal, the message selection signal and the record selection signal are generated by the image synthesizing terminal equipment 3 itself, not by the computer 1.

As can be seen from the above detailed description, according to the present invention, a background picture is displayed by the video signal stored in the image storage unit instead of an output program of a computer for producing the background picture. Accordingly, the operation screen including a user-oriented language, graphic patterns, tables, process flowsheets, and the like can be produced and modified promptly and inexpensively by storing the background picture in the image storage unit. In addition, the background picture which has been complicated and difficult to produce can be produced independently of the information processor such as a computer and without the need of any knowledge on the information processor, thereby allowing the standardization of software for producing the operation screen.

According to the present invention, by arrangement of the image storage unit for storing the audio signal as well as the video signal, it becomes possible to direct the operator in both visual and audible ways.

Moreover, by arrangement of the image storage unit for storing the video signal of the operation screen, the operational history can be recorded and reproduced, and further a hard copy can be obtained by the video signal of the operation screen, thereby allowing the preservation of the operation screen in the form of the hard copy.

What is claimed is:

1. An information processing system terminal equipment comprising:

an image storage apparatus for storing a variable video signal of a background picture which has been produced by a picture signal generating apparatus such as a video camera for converting a visual image into a video signal, and for outputting said variable video signal of the background picture selected by said information processing system;

an information processing apparatus for outputting a video image;

an image signal synthesizing apparatus for adding a variable video signal of a background picture outputted from said image storage apparatus to a video signal of a foreground picture in accordance with the video image of said information processing apparatus, and for outputting a resultant video signal; and a display apparatus for displaying a picture in response to said resultant video signal supplied from said image signal synthesizing apparatus, whereby a background picture is displayed by the use of said image storage apparatus.

2. An information processing system terminal equipment as claimed in claim 1, wherein said image storage apparatus includes means for storing both said background video signal and an audio signal to thereby provide for simultaneous visual display and audible addressing.

3. An information processing system terminal equipment as claimed in claim 1 or 2, wherein said display apparatus comprises a hard copy apparatus which produces a hard copy of said display in response to said resultant video signal supplied from said image signal synthesizing apparatus.

4. An information processing system terminal equipment as claimed in claim 1 or 2, wherein said image storage apparatus is provided with a storage area for storing said resultant video signal from said image signal synthesizing apparatus so that displayed information is reproduced in response to a command signal from said information processing apparatus.

* * * * *